(12) United States Patent
Smith et al.

(10) Patent No.: US 10,518,597 B1
(45) Date of Patent: Dec. 31, 2019

(54) TOE LINK SUPPORT AND METHOD OF SUPPORTING A TOE LINK

(71) Applicant: Shock Therapy, LLC, Phoenix, AZ (US)

(72) Inventors: Justin Smith, Phoenix, AZ (US); Ernie Ely, Phoenix, AZ (US)

( * ) Notice: Subject to any disclaimer, the term of this patent is extended or adjusted under 35 U.S.C. 154(b) by 0 days.

(21) Appl. No.: 16/228,463

(22) Filed: Dec. 20, 2018

Related U.S. Application Data

(60) Provisional application No. 62/742,062, filed on Oct. 5, 2018.

(51) Int. Cl.
*B60G 7/00* (2006.01)

(52) U.S. Cl.
CPC ............. *B60G 7/006* (2013.01); *B60G 7/001* (2013.01); *B60G 2206/90* (2013.01)

(58) Field of Classification Search
CPC .......... F16B 5/02; F16B 5/0241; F16B 9/026; B60G 7/001; B60G 7/006; B60G 7/02; B60G 7/003
See application file for complete search history.

(56) References Cited

U.S. PATENT DOCUMENTS

| | | | | | |
|---|---|---|---|---|---|
| 3,111,307 | A | * | 11/1963 | Cuskie | B60G 3/20 267/248 |
| 3,526,413 | A | * | 9/1970 | Muller | B60G 7/02 280/86.756 |
| 4,714,270 | A | * | 12/1987 | Rumpel | B60G 3/26 280/124.144 |
| 4,863,329 | A | * | 9/1989 | Wilson | F16B 5/02 411/339 |
| 6,102,610 | A | * | 8/2000 | Palusis | F02K 1/80 403/179 |
| 2006/0070481 | A1 | * | 4/2006 | Kim | B60G 7/003 74/519 |

* cited by examiner

*Primary Examiner* — Daniel J Wiley
(74) *Attorney, Agent, or Firm* — Schmeiser, Olsen & Watts LLP

(57) ABSTRACT

A toe link support is disclosed. In a first aspect, the toe link aperture of a hub has been bored out to receive inner and outer spacers. The spacers have bolt holes through which a toe link bolt is inserted to secure a toe link to the hub. The bolt is secured by a nut. The spacers protect the hub from damage by the bolt, and vice versa, resulting from motion of the toe link. In a second aspect, the outer spacer is further configured to be inserted into the bolt hole of the toe link, further protecting the bolt from damage. A method of supporting a toe link is also disclosed.

5 Claims, 7 Drawing Sheets

TOE LINK SUPPORT AND METHOD OF SUPPORTING A TOE LINK

CROSS REFERENCE TO RELATED APPLICATION[S]

This application claims priority to U.S. Provisional Patent Application to Justin Smith entitled: "TOE LINK SUPPORT AND METHOD OF SUPPORTING A TOE LINK," Ser. No. 62/742,062, filed Oct. 5, 2018, the disclosure of which is hereby incorporated entirely herein by reference.

BACKGROUND OF THE INVENTION

Technical Field

This invention relates generally to vehicle suspension systems and particularly to a support for a toe link.

State of the Art

A conventional hub of a vehicle suspension system comprises a toe link aperture with a relative diameter corresponding to the diameter of a toe link bolt inserted therethrough. Conventional toe link bolts are in single shear, with forces in the toe link bolt, resulting from movement of the toe link acting on the toe link bolt, being counteracted only by contact of the toe link bolt with the hub at the inner surface of the toe link aperture. This often results in the toe link aperture being worn out or wallowed out by contact with the toe link bolt, leaving the toe link aperture out-of-round. The toe link bolt is often thereby left fitting loosely in the toe link aperture. The toe link bolt is also commonly damaged thereby by bending or breaking. Often, a hub may be further damaged by contact with the toe link and/or by contact with the nut. The hub may be made of a metal that is subject to bending, or such damage as described above by contact with a toe link or a toe link bolt or nut, such as aluminum, for example.

Accordingly, what is needed is a toe link support that reduces damage to the hub or the toe link bolt.

SUMMARY OF THE INVENTION

The present invention relates generally to vehicle suspension systems and particularly to a support for a toe link.

In embodiments of the present invention, a toe link support comprises an inner spacer and an outer spacer. The inner and outer spacers may be of substantially cylindrical shape, each spacer being configured with a flange about one end thereof. The inner and outer spacers are inserted into the toe link aperture of a hub, such that insertion depth of the inner and outer spacers is limited by engagement of the flanges thereof with the hub. Each of the inner and outer spacers further comprises a longitudinal aperture therethrough, the aperture being configured to receive a toe link bolt therethrough.

In embodiments, a toe link bolt may be inserted through an aperture in a rod end, through the apertures of the outer and inner spacers, and secured by a nut. In such embodiments, the hub is protected from contact with the nut by the inner spacer and the flange thereof. The hub is similarly protected from contact with the rod end by the outer spacer and the flange thereof. The hub is also protected from contact with the toe link bolt by the inner and outer spacers. The hub and the toe link bolt are thereby protected, by the inner and outer spacers, from damage resulting from motion of the rod end.

In some embodiments, a second end of the outer spacer extends beyond the flange, wherein the flange is disposed about a middle portion thereof such that the outer spacer may also be inserted into an aperture of the rod end. Thereby a first end of the outer spacer may be inserted into the toe link aperture of the hub and the second end of the outer spacer may be inserted into the aperture of the rod end, wherein the insertion depth of the first end into the toe link aperture of the hub is limited by engagement of the flange with the hub and the insertion depth of the second end into the aperture of the rod end is limited by engagement of the flange with the rod end. In addition, the flange has a tapered portion extending therefrom toward the second end. In such embodiments, the rod end may be configured to be fitted with inner and outer high misalignment spacers, the outer high misalignment spacer being inserted into the aperture of the rod end from the outer side of the rod end, and the second end of the outer spacer being inserted into the aperture of the rod end from the inner side of the rod end. In such embodiments, the inner high misalignment spacer is discarded, having been replaced by the second end of the outer spacer. The tapered portion of the flange thereby separates the rod end from the hub to allow freedom of motion of the rod end, thus preventing contact of the rod end with the outermost edge of the flange and the hub.

Also disclosed is a method of supporting a toe link comprising: boring the toe link aperture of a hub; inserting an inner spacer into the toe link aperture from the inner side of the hub; inserting an outer spacer into the toe link aperture from the outer side of the hub; inserting a bolt through the aperture of a tie rod end and through the apertures of the outer and inner spacers, respectively, wherein the relative diameters of the inner and outer spacers corresponds to the diameter of the bored toe link aperture of the hub and the relative diameters of the apertures of the outer and inner spacers are the same as the diameter of the toe link aperture; and securing the bolt with a nut.

In some embodiments, the toe link aperture has been damaged such that the toe link aperture is out of round prior to boring the toe link aperture. In some embodiments, the method further comprises removing a damaged bolt from the toe link aperture.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
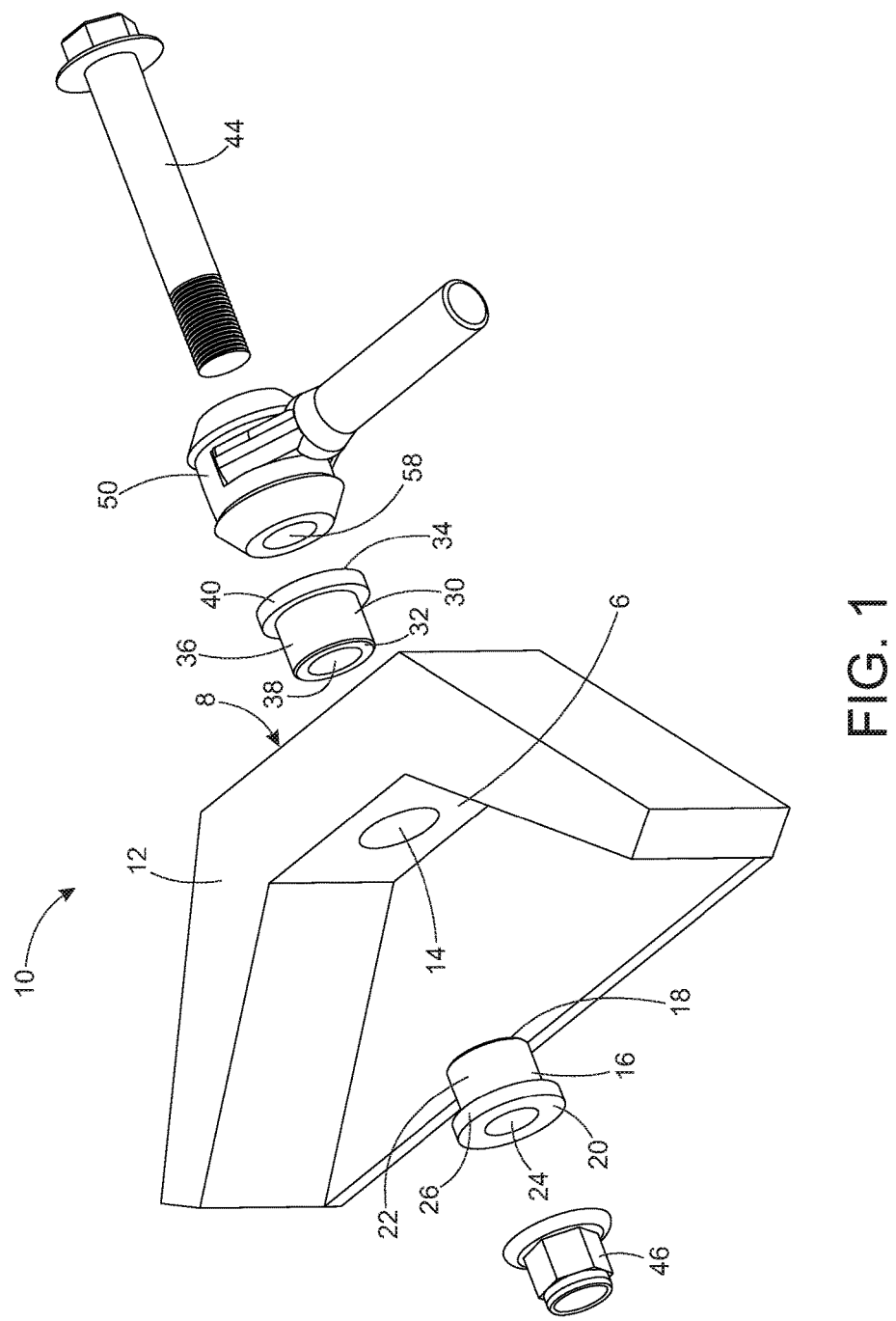
FIG. 1 is an exploded view of a toe link support, according to an embodiment.

As discussed above, embodiments of the present invention relate to vehicle suspension systems and particularly to a support for a toe link.

The term "hub", as used in this application, may refer to a "knuckle", "spindle", or "uprights" of a vehicle suspension system, and may be used interchangeably with those terms.

Conventional hubs comprise a toe link aperture with a diameter that corresponds to the diameter of a toe link bolt inserted therethrough. Conventional toe link bolts are in single shear, with forces in the toe link bolt, resulting from movement of the toe link acting on the toe link bolt, being counteracted only by contact of the toe link bolt with the hub at the inner surface of the toe link aperture. This often results in the toe link aperture being worn out or wallowed out, such as being ovaled out, cone shaped, or the like, by contact with the toe link bolt, leaving the toe link aperture out-of-round. The toe link bolt is often thereby left fitting loosely in the toe link aperture. The toe link bolt is also commonly damaged thereby by bending or breaking. Often, a hub may be further damaged by contact with the toe link and/or by contact with the nut. The hub may be made of a metal that is subject to bending, or such damage as described above by contact with a toe link or a toe link bolt or nut, such as aluminum, for example.

In embodiments of a toe link support 10 of the present invention, as shown in FIGS. 1-6, the toe link aperture 14 of the hub 12 may have been bored out to correct any prior damage to the toe link aperture 14. The toe link aperture 14 may thereby have a larger diameter that is suitable for receiving a pair of inner and outer spacers 16 and 30, wherein the diameter of the toe link aperture 14 corresponds to the diameters of the first ends 18 and 32 of the inner and outer spacers 16 and 30. In some embodiments, the inner and outer spacers 16 and 30 may be made of a metal that is resistant to bending, or such damage as described above by contact with a rod end 50 or a toe link bolt 44 or nut 46, such as stainless steel, for example.

Figure 2:
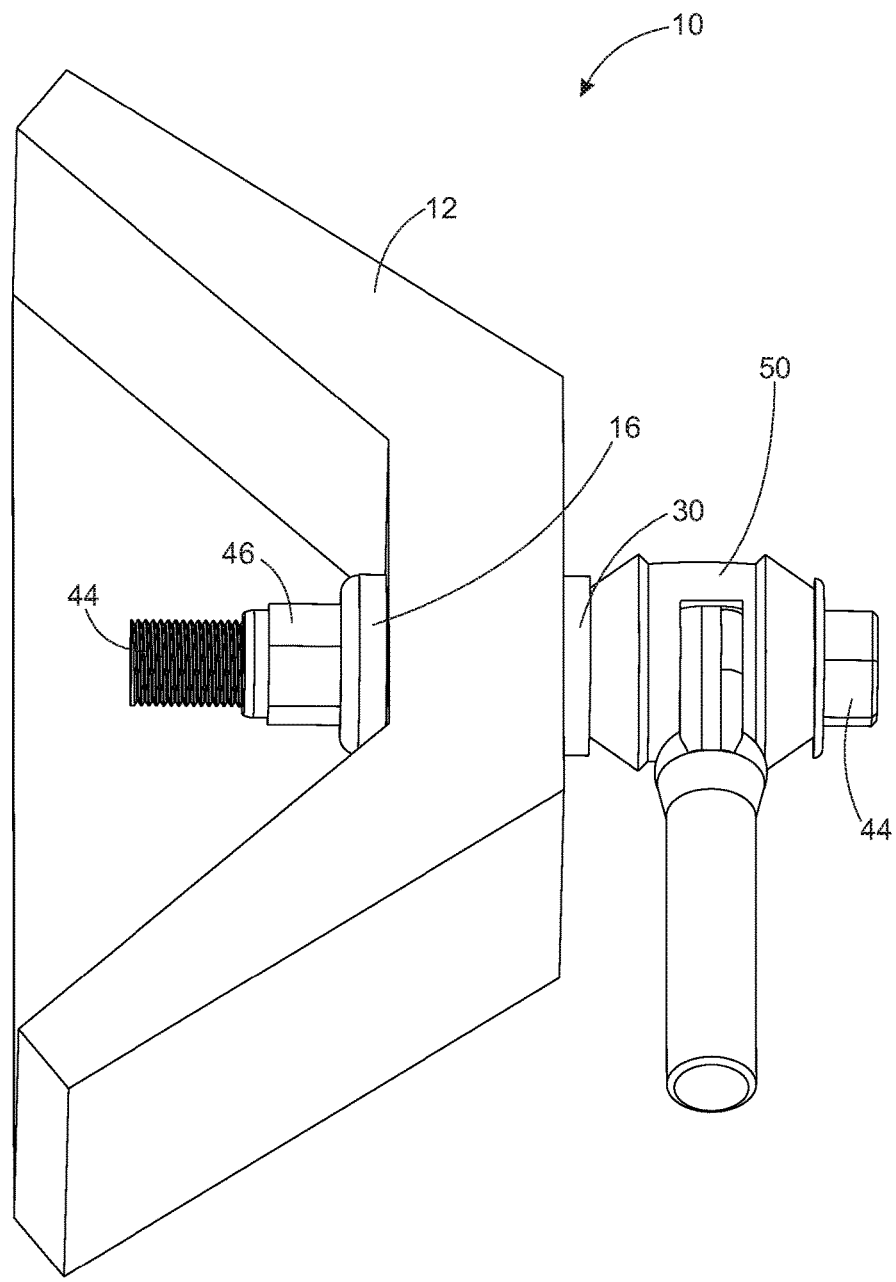
FIG. 2 is a perspective view of a toe link support, according to an embodiment.
Figure 3:
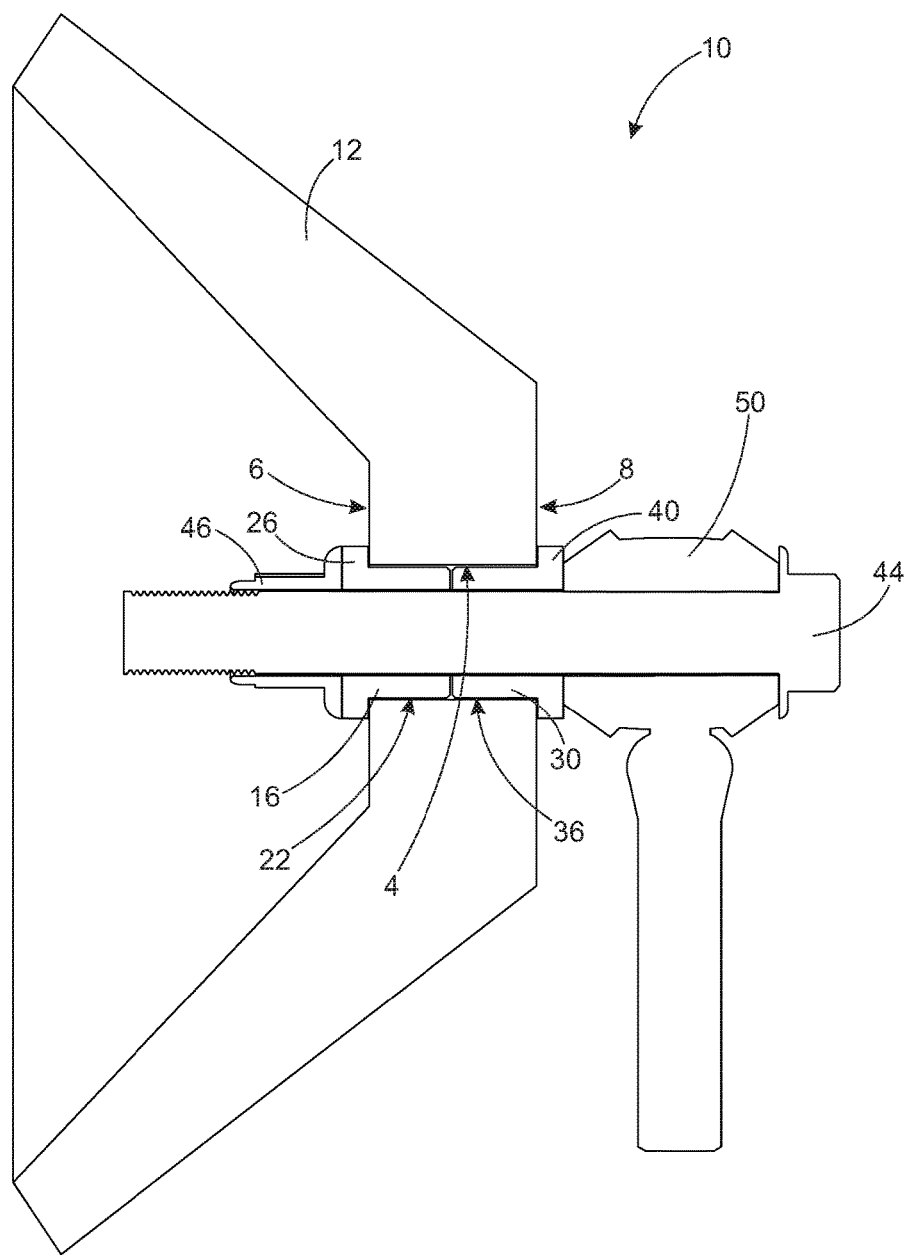
FIG. 3 is a section view of a toe link support, according to an embodiment.

In embodiments, a toe link support 10 comprises an inner spacer 16 and an outer spacer 30, as shown in FIGS. 1-3. The inner spacer 16 may be of substantially cylindrical shape having opposed first and second ends 18 and 20, with the second end 20 thereof having a flange 26 thereabout, wherein the first end 18 thereof is inserted into the toe link aperture 14 of the hub 12 from the inner side 6 of the hub 12. Insertion depth of the inner spacer 16 into the toe link aperture 14 of the hub 12 may be limited by engagement of the flange 26 thereof with the inner side 6 of the hub 12. The inner spacer 16 further comprises a longitudinal aperture 24 therethrough, the aperture 24 being configured to receive a toe link bolt 44 therethrough.

The outer spacer 30 may likewise be of substantially cylindrical shape having opposed first and second ends 32 and 34, with the second end 34 thereof having a flange 40 thereabout, wherein the first end 32 thereof is inserted into the toe link aperture 14 of the hub 12 from the outer side 8 of the hub 12. Insertion depth of the outer spacer 30 into the toe link aperture 14 of the hub 12 may be limited by engagement of the flange 40 thereof with the outer side 8 of the hub 12. The outer spacer 30 similarly further comprises a longitudinal aperture 38 therethrough, the aperture 38 being configured to receive a toe link bolt 44 therethrough.

In some embodiments, the first end 18 of the inner spacer 16 engages the first end 32 of the outer spacer 30. In other embodiments, the first end 18 of the inner spacer 16 and the first end 32 of the outer spacer 30 are separated by a gap.

In embodiments, as shown in FIGS. 1-3, a toe link bolt 44 may be inserted through an aperture 58 in a rod end 50, through the apertures 38 and 24 of the outer and inner spacers 30 and 16, respectively, and secured by a nut 46. In such embodiments, the hub 12 is protected from contact with the nut 46 by the inner spacer 16 and the flange 26 thereof. The hub 12 is similarly protected from contact with the rod end 50 by the outer spacer 30 and the flange 40 thereof. The hub 12 is also protected from contact with the toe link bolt 44 by the inner and outer spacer 30.

Because the inner and outer spacers 16 and 30 may be made of a material that is more resistant to damage than the material the hub 12 is made of, the inner and outer spacers 16 and 30 may be less susceptible to damage by contact with the toe link bolt 44, the nut 46, and the rod end 50. In addition, because the toe link aperture 14 of the hub 12 has been bored to a larger diameter than the diameter of the toe link bolt 44, such that the diameter of the toe link aperture 14 corresponds to the diameter of the inner and outer spacers 16 and 30, forces of the spacers 16 and 30 acting on the inner surface 4 of the toe link aperture 14, resulting from motion of the rod end 50, are dissipated over a larger surface area to the hub 12 than the smaller surface area of the smaller diameter conventional toe link aperture that is in direct contact with the toe link bolt. This results in a much lower possibility of damage to the hub 12 than with conventional systems.

Figure 4:
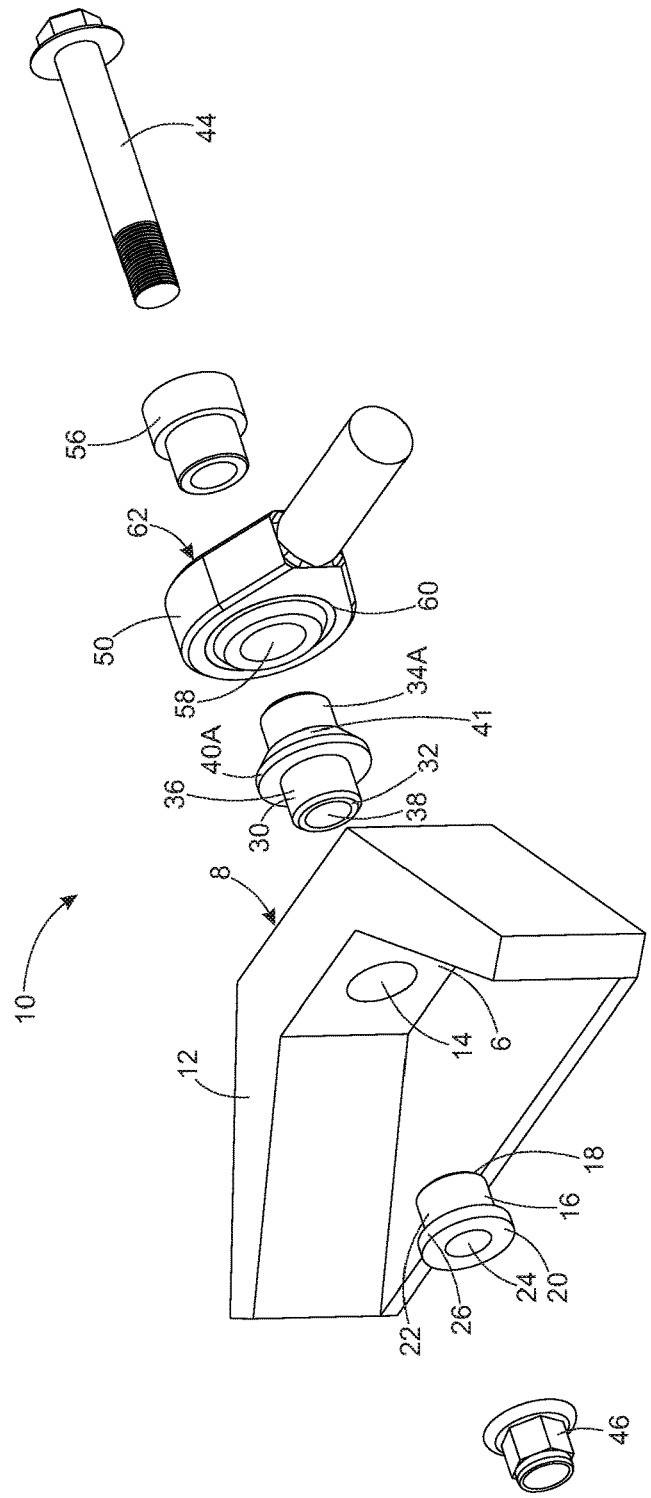
FIG. 4 is an exploded view of a toe link support, according to an alternative embodiment.
Figure 5:
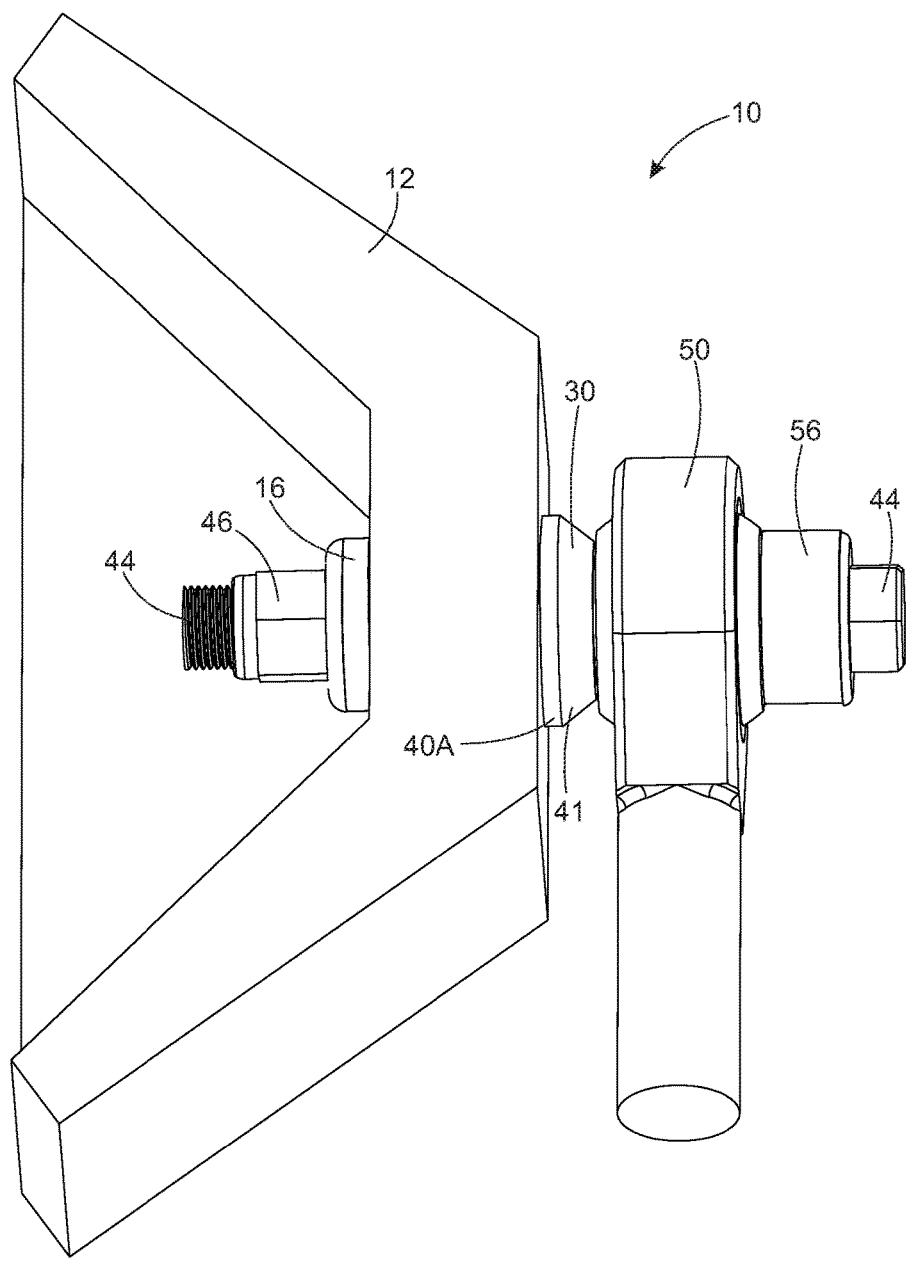
FIG. 5 is a perspective view of a toe link support, according to an alternative embodiment.
Figure 6:
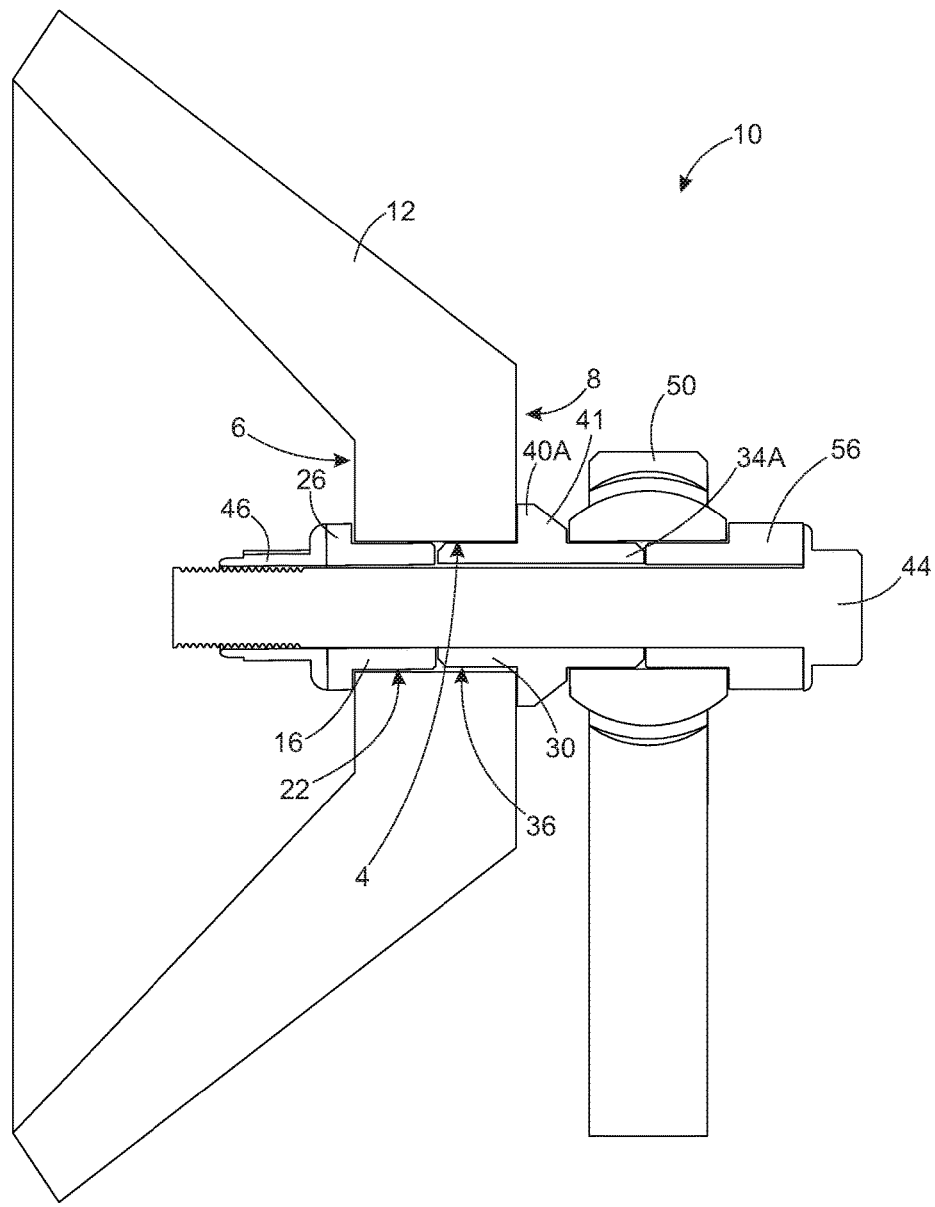
FIG. 6 is a section view of a toe link support, according to an alternative embodiment.

In some embodiments, as shown in FIGS. 4-6, a second end 34A of the outer spacer 30 may extend beyond a flange 40A, wherein the flange 40A is disposed about a middle portion thereof between the first end 32 and the second end 34A, such that the outer spacer 30 may also be inserted into an aperture 58 of the rod end 50. In addition, the flange 40A may have a tapered portion 41 extending therefrom toward the second end 34A. In such embodiments, the rod end 50 may be configured to be fitted with inner and outer high misalignment spacers (inner high misalignment spacer not shown) and, the outer high misalignment spacer 56 being inserted into the aperture 58 of the rod end 50 from the outer side 62 of the rod end 50, and the second end 34A of the outer spacer 30 being inserted into the aperture 58 of the rod end 50 from the inner side 60 of the rod end 50. The tapered portion 41 of the flange 40A may thereby separate the rod end 50 from the hub 12 to allow freedom of motion of the rod end, thus preventing contact of the rod end 50 with the outermost edge of the flange 40A and the hub 12. In such embodiments, the inner high misalignment spacer on the tie rod end 50 is discarded, having been replaced by the second end 34A of the outer spacer 30 of the invention.

In some embodiments, the second end 34A of the outer spacer 30 engages the outer high misalignment spacer 56. In other embodiments, the second end 34A of the outer spacer 30 and the outer high misalignment spacer 56 are separated by a gap.

Figure 7:
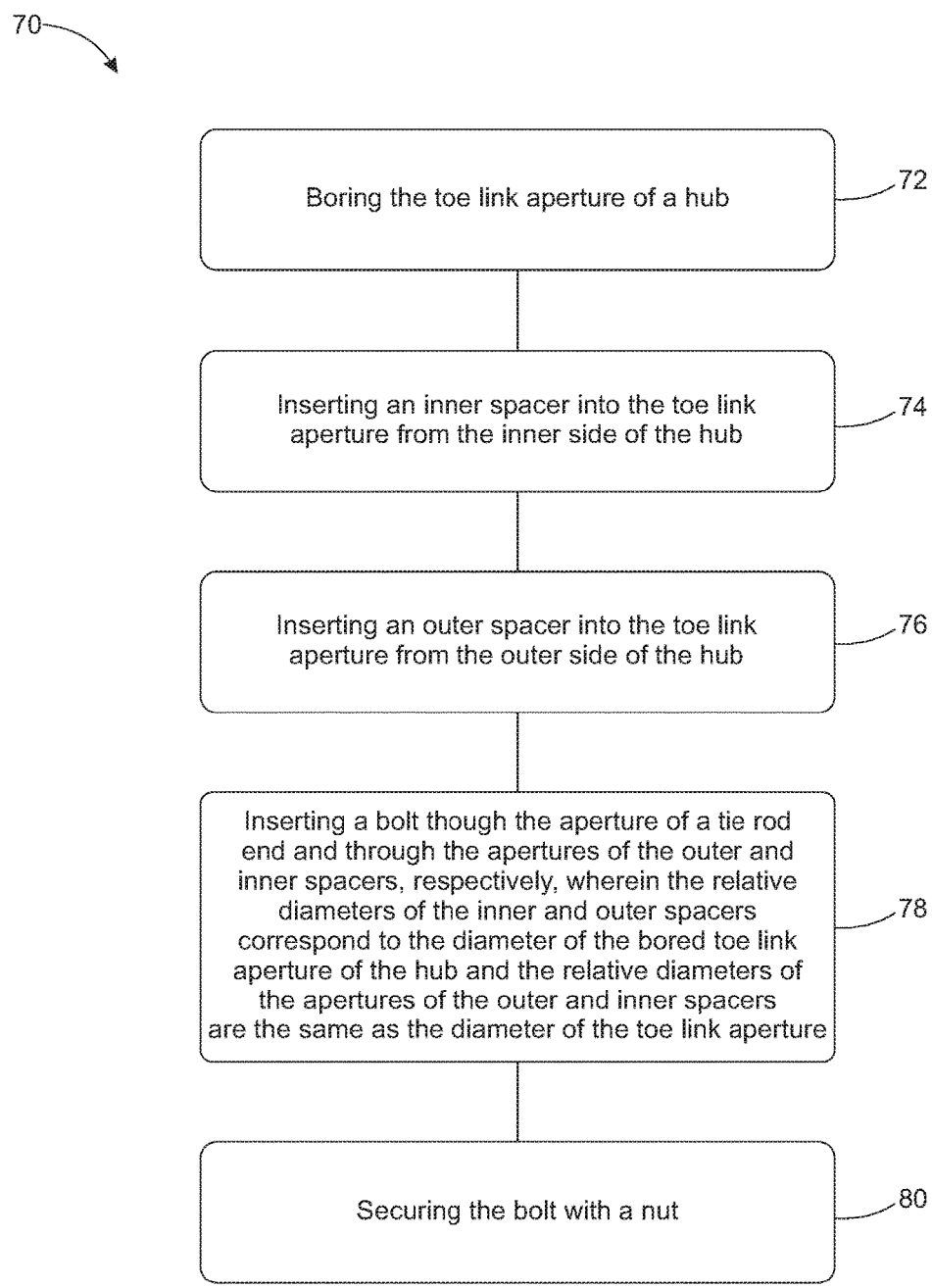
FIG. 7 illustrates a method of supporting a toe link, according to an embodiment.

FIG. 7 illustrates a method 70 of supporting a toe link comprising: boring the toe link aperture of a hub (Step 72); inserting an inner spacer into the toe link aperture from the inner side of the hub (Step 74); inserting an outer spacer into the toe link aperture from the outer side of the hub (Step 76); inserting a bolt through the aperture of a tie rod end and through the apertures of the outer and inner spacers, respectively, wherein the relative diameters of the inner and outer spacers corresponds to the diameter of the bored toe link aperture of the hub and the relative diameters of the apertures of the outer and inner spacers are the same as the diameter of the toe link aperture (Step 78); and securing the bolt with a nut (Step 80).

In some embodiments of the method, the toe link aperture has been damaged such that the toe link aperture is out of round prior to boring the toe link aperture. In some embodiments, the method further comprising removing a damaged bolt from the toe link aperture.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A toe link support comprising:
  an inner spacer of substantially cylindrical shape, the inner spacer further comprising:
    opposed first and second ends, wherein the first end is inserted into the toe link aperture of a hub from the inner side of the hub, the second end having a flange thereabout such that insertion depth of the first end into the toe link aperture is limited by engagement of the flange with the inner side of the hub, wherein the outer surface of the inner spacer engages the inner surface of the toe link aperture; and
    a longitudinal aperture therethrough, the aperture being configured to receive a toe link bolt therethrough;
  an outer spacer of substantially cylindrical shape, the outer spacer further comprising:
    opposed first and second ends, wherein the first end is inserted into the toe link aperture of a hub from the outer side of the hub, the second end having a flange thereabout such that insertion depth of the first end into the toe link aperture is limited by engagement of the flange with outer side of the hub, wherein the outer surface of the inner spacer engages the inner surface of the toe link aperture; and
    a longitudinal aperture therethrough, the aperture being configured to receive a toe link bolt therethrough; and
  a rod end having a rod end aperture therethrough for receiving a toe link bolt therethrough, the second end of the outer spacer being further configured to be inserted into the rod end aperture, wherein the second end of the outer spacer is inserted into the rod end aperture from the inner side of the rod end, wherein insertion depth of the second end of the outer spacer into the rod end aperture is limited by engagement of the flange with the inner side of the rod end.

2. The toe link support of claim 1, wherein the toe link aperture of the hub has been bored out to a larger diameter than its original factory diameter.

3. The toe link support of claim 1, wherein the first end of the inner spacer engages the first end of the outer spacer.

4. The toe link support of claim 1, wherein the second end of the outer spacer engages an outer high misalignment spacer inserted into the rod end aperture from the outer side of the rod end.

5. The toe link support of claim 1, wherein a toe link bolt is inserted through the aperture of an outer high misalignment spacer, the outer high misalignment spacer being inserted into the rod end aperture from the outer side of the rod end, the toe link bolt also being inserted through the apertures of the inner and outer spacers, respectively, and secured with a nut.

\* \* \* \* \*